United States Patent
Wu et al.

(10) Patent No.: US 10,830,665 B2
(45) Date of Patent: Nov. 10, 2020

(54) DAMAGE DETECTION WITH SELF-POWERED WIRELESS SMART COATING SENSOR

(71) Applicant: University of Manitoba, Winnipeg (CA)

(72) Inventors: Nan Wu, Winnipeg (CA); Farjana Faisal, Winnipeg (CA); Samuel Osho, Winnipeg (CA)

(73) Assignee: University of Manitoba, Winnipeg (CA)

( * ) Notice: Subject to any disclaimer, the term of this patent is extended or adjusted under 35 U.S.C. 154(b) by 104 days.

(21) Appl. No.: 16/318,547

(22) PCT Filed: Aug. 8, 2017

(86) PCT No.: PCT/CA2017/050938
§ 371 (c)(1),
(2) Date: Jan. 17, 2019

(87) PCT Pub. No.: WO2018/032093
PCT Pub. Date: Feb. 22, 2018

(65) Prior Publication Data
US 2019/0316986 A1    Oct. 17, 2019

Related U.S. Application Data

(60) Provisional application No. 62/375,148, filed on Aug. 15, 2016.

(51) Int. Cl.
*G01M 5/00* (2006.01)
*G01H 11/08* (2006.01)
(Continued)

(52) U.S. Cl.
CPC .......... *G01M 5/0083* (2013.01); *G01H 11/08* (2013.01); *G01M 5/0033* (2013.01);
(Continued)

(58) Field of Classification Search
CPC ............ G01M 5/0083; G01M 5/0033; G01M 5/0066; G01M 7/00; G01H 11/08; G01N 19/04; G01N 19/08
(Continued)

(56) References Cited

U.S. PATENT DOCUMENTS 6,731,270 B2 * 5/2004 Tosaya .................. B06B 1/0655
178/18.01
2005/0142888 A1 * 6/2005 Ebuchi ............... H03H 9/02133
438/738
(Continued)

*Primary Examiner* — Max H Noori
(74) *Attorney, Agent, or Firm* — Kyle R Satterthwaite; Ryan W Dupuis; Ade & Company Inc.

(57) ABSTRACT

A low cost and efficient damage detection method is developed by introducing a new piezoelectric composite coating combined with a self-powered wireless signal transmission module. The new piezoelectric composite coating composed with a piezoelectric layer, an electrical conductive layer and an insulator, is designed as the sensor and to be easily applied on rough surfaces of engineering structures, such as concrete and the welded joint area. An energy harvesting circuit and an automatic electronic switch controlled by the piezoelectric coating sensor are designed to power and control the wireless signal transmitter sending warning signals of the damage occurrence. Methodology is explained in detail, and successful detection of the occurrence of crack propagation on a beam structure has been realized through experimental testing.

20 Claims, 8 Drawing Sheets

(51) Int. Cl.
  *G01M 7/00*      (2006.01)
  *G01N 19/04*     (2006.01)
  *G01N 19/08*     (2006.01)

(52) U.S. Cl.
  CPC ............ *G01M 5/0066* (2013.01); *G01M 7/00* (2013.01); *G01N 19/04* (2013.01); *G01N 19/08* (2013.01)

(58) Field of Classification Search
  USPC .......................................................... 73/774
  See application file for complete search history.

(56) References Cited

U.S. PATENT DOCUMENTS

| | | | | |
|---|---|---|---|---|
| 2009/0038403 | A1* | 2/2009 | Kamei | G01L 1/16 73/774 |
| 2011/0090291 | A1* | 4/2011 | Hirai | B41J 2/14233 347/70 |
| 2018/0264815 | A1* | 9/2018 | Kura | H01L 41/0471 |
| 2019/0123260 | A1* | 4/2019 | Kakamu | H01L 41/29 |
| 2020/0204155 | A1* | 6/2020 | Inoue | H03H 3/0077 |

* cited by examiner

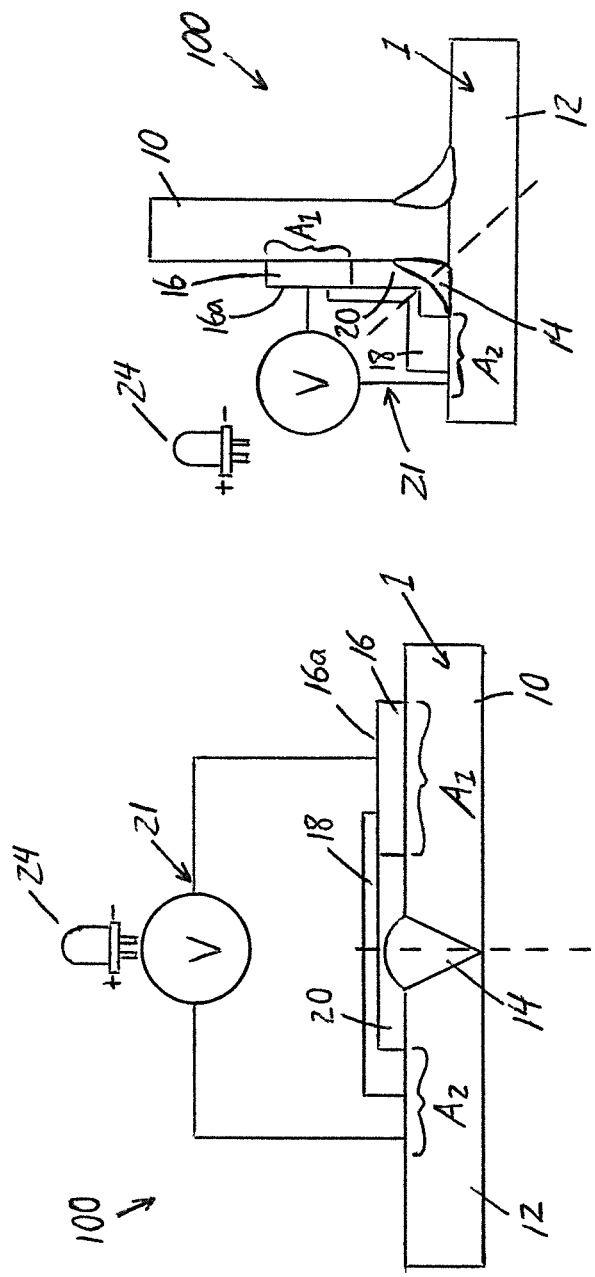

Connected to power supply from the charged super capacitor

Connected to piezo smart coating

Connected to the wireless data transmitter. When the damage occur, the piezo smart coating will turn on the switch powering the data transmitter to send the warning signal.

DAMAGE DETECTION WITH SELF-POWERED WIRELESS SMART COATING SENSOR

FIELD OF THE INVENTION

The present invention relates generally to the detection of cracks or fractures in a structure, and more particularly to a composite coating using a piezoelectric element to provide real-time detection and wireless reporting of such damage on structures subjected to vibrational loads.

BACKGROUND

Detection of structural damages especially at their earliest stage is a vital process in engineering to avoid calamitous and irreparable damages. For example, heavy automotive manufacturers and aircraft related industries are always facing a problem of how to detect possible fractures at frame welded joints while the structure is in operation and without having to strip off the coating materials of the coach. In addition, the companies operating and maintenance civil structures always need to check the possible damages of their structures by sending inspectors, which induces economy and safety issues. A low cost, self-powered and simple on-board damage detection system is desired.

Bearing this in mind for the last few decades, structural health monitoring (SHM) with different damage identification techniques have been a largely concerned field of study for numerous researches from both industrial and academic communities.

Local damage detection methods which are mostly referred to as non-destructive tests (NDTs), such as X-ray test, ultrasonic, and magnetic particle test etc., have been well studied [1]. However, these techniques have been proven to be unsuitable in particular cases due to long inspection times [1], expensiveness of some methods, inability to reach the damaged area and most importantly they are not capable of on-line real-time continuous detection of damages [1]. Vibration signals of a structure carries great amount of information about the healthiness of that particular structure. Numerous reviews [2-5] can be found in the literature on vibration based damage detection methodologies proposed in the past several decades.

In addition to traditional methods for detecting damage that involve disassembling the engineering parts, there are new non-destructive damage detection techniques that have been developed in the recent decades, including crack detection using the vibration power flow [6], lamb wave actuation by piezoelectric actuator [7], and wavelets transformation to extract information from different kinds of data [8]. The noise in the dynamic signal, which may reduce the accuracy and effectiveness of damage detection using classic time-frequency analysis, is usually inevitable. In addition to dynamic analysis for the health monitoring, space domain wavelet analysis was also proven to be efficient in the accurate detection and location of damage [9, 10]. Previous studies required experiments to be conducted in lab or workshop environments with complex experimental set-ups and opened coach structures. Good techniques that can realize the low cost on-board real time testing on varies mechanical and civil structures are still desirable in industry and the SHM research field. An approach such as the one proposed in this the present application would help to evaluate the working condition of active structures and predict the possibility of future structural failures.

In the present application, disclosed are new data acquisition systems with smart material coatings that are easy to apply on the different surfaces of engineering structures in order to detect fatigue.

SUMMARY OF THE INVENTION

According to a first aspect of the invention, there is provided a composite coating for use in detecting damage to a structure that is subject to vibrations, said apparatus comprising:
  a piezoelectric layer applied to an electrically conductive surface on the structure at a first area thereof;
  an electrically conductive layer overlapping an outer surface of said piezoelectric layer and spanning to a discrete second area of the electrically conductive surface where said electrically conductive layer contacts said second area of the electrically conductive surface; and
  an isolating layer of electrically insulative material disposed between the electrically conductive surface and the electrically conductive layer at an intermediate area residing between said first and second areas to electrically isolate the electrically conductive layer from the electrically conductive surface over said intermediate area.

The coating is preferably used in combination with a detection circuit connected between the outer surface of the piezoelectric layer and the second area of the electrically conductive surface, said detection circuit normally having a zero voltage measurement thereacross due to an electrical short defined between the outer surface of the piezoelectric layers and the second area of the electrically conductive surface by the conductive layer, until damage to the structure at the intermediate area causes a break in the electrically conductive layer, at which point excitation of the piezoelectric layer by vibration of the structure creates a non-zero voltage in the detection circuit, thereby confirming the presence of said damage.

Preferably the detection circuit comprises a transmitter arranged to wirelessly transmit a damage warning signal in response to said non-zero voltage.

Preferably the transmitter is powered by a power source comprising a piezoelectric voltage source on the same structure, for example in the form of a second piezoelectric layer residing at a separate area located discretely of the first, second and intermediate areas.

Such embodiments thus provide an on-board testing solution achieving efficient crack/fracture detection with a self-powered wireless sensor made from piezoelectric composite coatings.

According to a second aspect of the invention, there is provided a system for use in detecting damage to a structure that is subject to vibrations, said system comprising:
  a composite coating comprising:
    a piezoelectric element for application over an electrically conductive surface on said structure at a first area thereof; and
    an electrically insulative material for application over said electrically conductive surface in a position adjacent said piezoelectric element to define an isolating layer;
    a spreadable electrically conductive material for application to the structure along a path reaching from a position overlapping the piezoelectric element and bridging over the isolating layer to a second discrete area on the electrically conductive structure, thereby defining an electrical short spanning between the first and second areas of the electrically conductive surface and bridging over an intermediate area between said first and second areas; and a detection circuit connectable between an outer surface of the piezoelectric layer and the second area of the electrically conductive surface to detect occurrence of damage to the structure at the intermediate area via a change in relative voltage between the outer surface of the piezoelectric layer and the second area of the conductive surface when said damage to the structure causes a break in the electrical short between the piezoelectric layer and the second area of the electrically conductive surface, whereby a zero-voltage normally exists in the detection circuit, even during excitation of the piezoelectric element by vibration of the structure, due to the electrical short between the piezoelectric element and the second area of the electrically conductive surface, but breakage of the conductive layer by said damage to the structure generates a non-zero voltage in the detection circuit during excitation of the piezoelectric element by vibration of the structure.

BRIEF DESCRIPTION OF THE DRAWINGS

One embodiment of the invention will now be described in conjunction with the accompanying drawings in which:

FIG. 1A schematically illustrates application of a piezoelectric composite coating to a welded butt joint of a metal structure to serve as a damage detection module monitoring said butt joint.

FIG. 1B schematically illustrates application of the piezoelectric composite coating to a welded tee-joint of a metal structure to serve as a damage detection module monitoring said tee joint.

In the drawings like characters of reference indicate corresponding parts in the different figures.

DETAILED DESCRIPTION

Figures 2A, 2B:
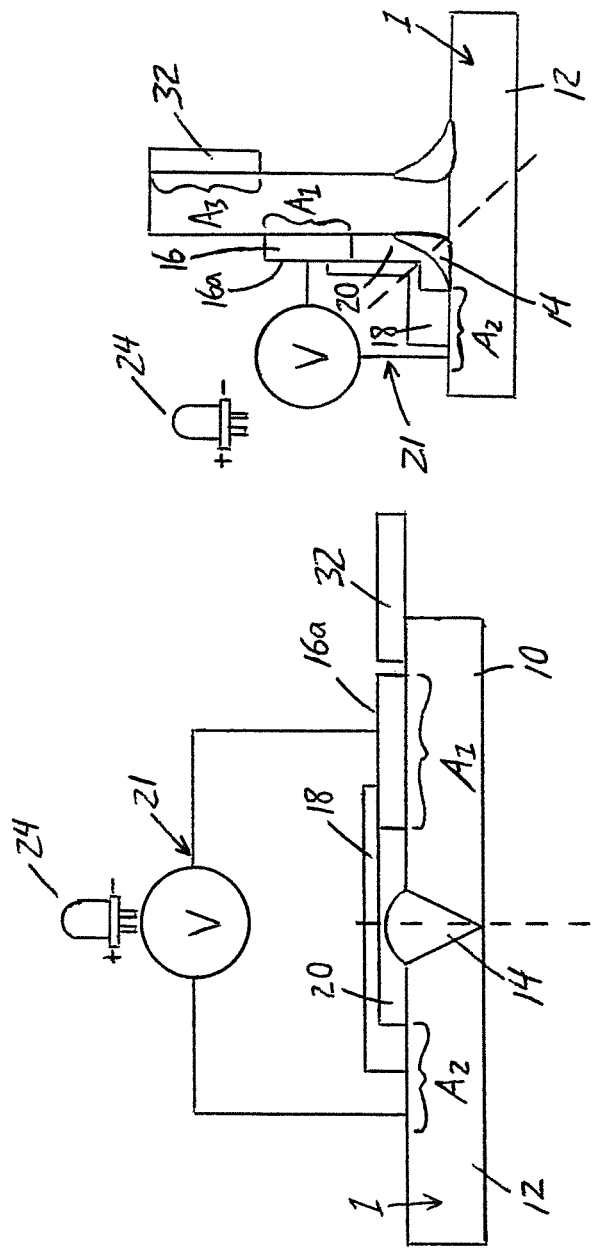
FIG. 2A illustrates the addition of an additional piezoelectric patch to the composite coating of FIG. 1A to serve as a piezoelectric power source for a wireless signal transmission module that transmits output signals from the damage detection module at the butt joint.
FIG. 2B illustrates the addition of an additional piezoelectric patch to the composite coating of FIG. 1B to serve as a piezoelectric power source for a wireless signal transmission module that transmits output signals from the damage detection module at the tee joint.

The design of a new piezoelectric composite coating according to a preferred embodiment of the present invention is first explained in detail herein to show the crack detection methodology employed thereby. Subsequently, the whole sensor system design is provided with further description of a self-powering wireless signal transmitter module for conveying warning messages to monitoring personnel.

A new piezoelectric composite coating is disclosed herein, and can be applied easily to a welded joint area of a metal frame structure, such as a coach frame, as schematically illustrated in FIGS. 1A and 1B, where a first metal frame member 10 is attached to a second metal frame member 12 by a weld joint 14. FIG. 1A illustrates application to a butt joint, where the two frame members are joined end-to-end with one another in coplanar relation, while FIG. 1B illustrates application to a tee joint, where the first frame member 10 stands perpendicular to the second frame member 12 with one end of the first frame member abutted against a face of the second frame member. These are merely two illustrative examples, and the teachings of the present invention may likewise be applied to other types of joints.

The welded metal frame is electrically conductive, and the frame is grounded with zero electrical potential. First, a piezoelectric layer 16 in the form of a piezoelectric patch transducer is attached to a surface of the first frame member 10 at a first area $A_1$ close to, but spaced from, the welded joint 14. By way of a thin conductive layer 18, the outer surface 16a of the piezoelectric layer 16 is then short connected to a discrete second area $A_2$ situated on the second frame member 12 at a location across the welded joint 14 from the first area $A_1$. Over the full length of its span from the first area $A_1$ to the second area $A_2$, the conductive layer 18 is electrically isolated from the underlying frame members 10, 12 and welded joint 14 by a thin insulator 20 that underlies the conductive layer and covers up this intermediate area of the structure between the first and second areas $A_1$, $A_2$. The conductive layer 18 thus bridges over the isolating layer 20 and the underlying joint 14 from a point overlapping the outer surface 16a of the piezoelectric patch 16 at the first area $A_1$ to a point situated beyond the opposing terminus of the insulative layer 20, thereby forming an electrical short between the second frame member 12 and the piezoelectric patch 16. The isolating and conductive layers are provided in the form of spreadable materials which can be applied on the surface of the structure similar to a paint. The piezoelectric patch 16, adjacent isolating layer 20 and overlying conductive layer 18 thus form a composite coating on the frame structure.

During the operation of the coach, the frame structure will be vibrating, and electrical charge and voltage will accordingly be generated on the piezoelectric layer surface 16a. However, since the piezoelectric layer surface 16a is short connected to the electrically conductive surface of the second frame member 12, in the absence of any crack or fracture in the conductive layer 18 in the bridging area thereof that spans between the first and second areas $A_1$, $A_2$ of the frame structure, the voltage reading V on the surface of the piezoelectric layer will be zero. That is, a a zero-voltage measurement normally exists in a detection circuit 21 connected between the outer surface 16a of the piezoelectric patch 16 on the first frame member and the electrically conductive second. However, when a crack or fracture occurs at the welded joint 14 during vibration of the structure, the isolation and conductive layers 20, 18 of the composite coating painted over the joint 14 will be broken at this crack or fracture, thus breaking the electrical short previously provided by the conductive layer 18 between the piezoelectric patch 16 and the second area $A_2$. Even if only for a very short period of time, there will accordingly be a non-zero voltage measurement on the piezoelectric layer surface 16a, as the voltage generated at the piezoelectric patch by the vibration of the structure is no longer shorted to the second area due to the broken state of the conductive layer 18 of the composite coating. Accordingly, this non-zero voltage status in the detection circuit 21 serves as an indication that a crack or fracture has occurred at the welded joint of the frame structure, whereby the composite coating and the detection circuit 21 form a damage detection module 100 of the overall system described in additional detail further below.

The piezoelectric composite coating can be applied easily on different types of surfaces, and is not limited particularly to the forgoing example of monitoring a welded joint of an electrically conductive metal structure that is grounded with zero electrical potential. The composite coating may similarly be used on non-conductive materials, such as concrete structures. To provide the same functionality in such instances, a preliminary conductive layer/coating is first applied directly to the non-conductive structure prior to application of the piezoelectric area. That is, a first layer of spreadable conductive material is first coated onto the non-conductive structure in a manner covering and spanning between the two discrete areas $A_1$ and $A_2$, and this first conductive layer is then grounded. The piezoelectric patch 16, isolating layer 18 and final conductive layer 20 are then applied in the same manner as described above for a conductive structure. While the metal frame example of FIGS. 1A and 1B involves monitoring of a welded joint and thus has areas $A_1$ and $A_2$ situated on different frame members joined together by the welded joint, it will be appreciated that in other scenarios, $A_1$ and $A_2$ may simply be discrete areas on an integral unitary component or structure, whereby the composite coating is useful to monitor for failures in the unitary structure itself between those two discrete areas.

With continued reference to FIGS. 1A and 1B, a low voltage alarm device or indicator, such as an LED 24, may be wired in the detection circuit 21 between the piezoelectric patch 16 and the second area $A_2$ of the structure so that this low voltage indicator 24 is activated by the non-zero voltage created between these two points by the detected crack or fracture. A small capacitor may be wired between the indicator 24 and the piezoelectric patch 16 in the detection circuit to build-up of sufficient charge from the excitation of the piezoelectric patch after a crack or fracture has emerged to activate the indicator. However, detected illumination of the LED 24 by either on-site personnel or by remote video monitoring would be required to monitor the status of the indicator.

Therefore, preferred embodiments instead use the non-zero charge and voltage generated by the piezoelectric composite coating to activate a wireless data transmitter that sends out a warning signal to appropriate monitoring personnel, thereby enabling convenient remote monitoring. For example, turning briefly to FIG. 3, the non-zero charge and voltage may be captured by a small capacitor 26 via a rectifier 27 and used by an electronic switch 28 that is connected to the small capacitor in order to turn on the wireless data transmitter 30 to send out warning signals to appropriate monitoring personnel. With reference to FIG. 2, in order to provide self-powering capability to this wireless signal transmission module, a second piezoelectric patch 32 is applied to the structure at a discrete third area $A_3$ to serve as a piezoelectric energy harvester for generating energy anytime the structure is vibrating. Using a larger second capacitor 34, this energy can be stored for later use to activate the wireless transmitter once a crack or fracture has been detected by the composite coating.

Figure 3:
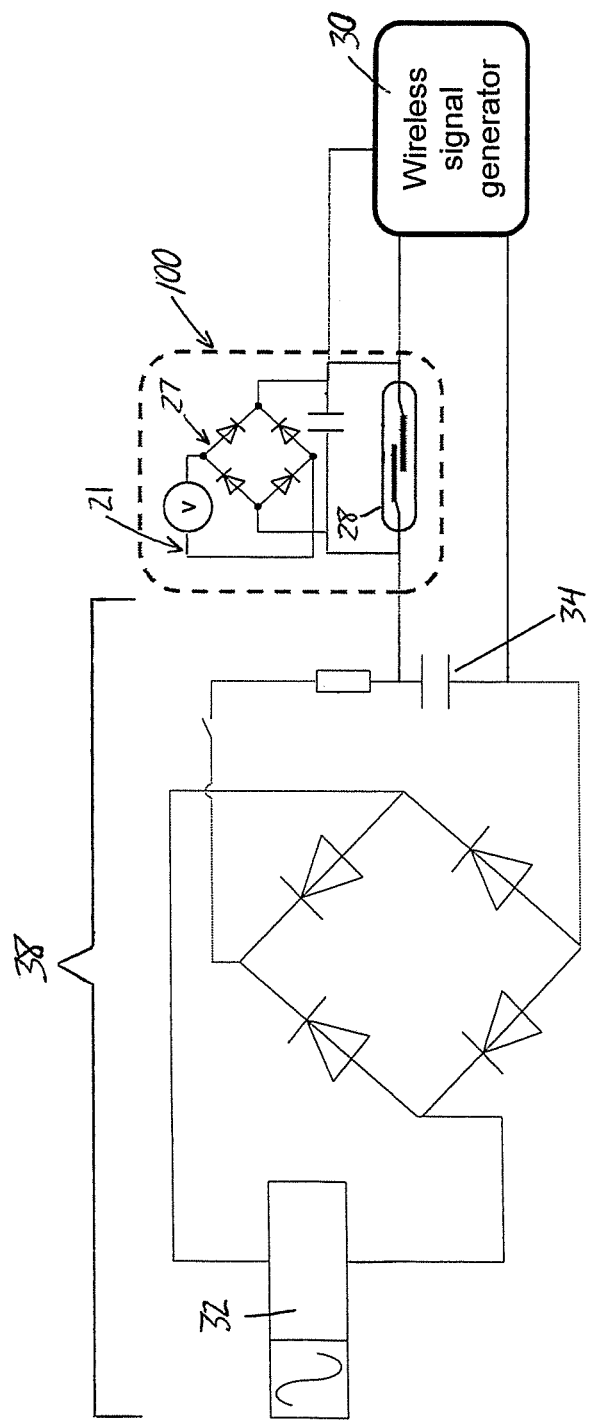
FIG. 3 is a schematic circuit illustration of an overall damage detection system incorporating the damage detection and wireless reporting modules.

The small capacitor 26, electronic switch 28, the wireless data transmitter 30 and larger second capacitor 34 are all shown in FIG. 3, which illustrates the design of the entire self-powered wireless crack sensor system, including the damage detection and signal transmission modules. The piezoelectric composite coating and the wireless signal transmission module are combined to realize the on-board real-time fracture/crack detection functionality of the overall system. During the operation of the host structure (e.g. during travel of a coach or other vehicle whose frame is equipped with the described sensor), the additional piezoelectric patch 32 will keep collecting kinetic energy from the vibration of the host structure and thereby generate an electrical signal to charge the super capacitor 34 via a rectifier 36 in the energy harvesting circuit 38 shown in the left half of FIG. 3. In this case, the super capacitor 34 is assumed to be always fully charged before the damage happens at the monitored area of the host structure.

In FIG. 3, it is seen that an electronic switch 28, which may be a simple thyristor triode, is located between the wireless signal transmitter 30 and the energy harvesting circuit 38 that serves as its power source. The default condition of electronic switch 28 is at an 'off' state when there is no damage at the monitored area of the structure covered by the composite coating sensor. Once the fracture/crack occurs in the monitored area of the structure and thus breaks the conductive layer 20 of the composite coating on the monitored area, the piezoelectric layer surface 16a of the composite coating will no longer be short connected. With the ongoing vibration experienced during the operation of the host structure, a non-zero voltage V will be generated on the piezoelectric layer surface 16, thereby signifying detection of the damage to the structure.

The voltage generated on the piezoelectric coating is dynamic AC voltage and does not have a constant value. Therefore, in order to control/turn-on the electronic switch 28 to give continuous power supply to the wireless signal transmitter, a small capacitor 26 is used to stabilize the output voltage generated from the piezoelectric layer 16 in the composite coating. When the small capacitor 26 is fully charged, via rectifier 27, it turns on the electrical switch 28 in a short period so as to activate/turn-on the wireless signal transmitter. That is, the charged capacitor 26 provides a gate signal that switches the electronic switch into its 'on' or conductive state, thereby connecting the wireless signal transmitter to its power source (i.e. the energy harvesting circuit 38). The wireless signal transmitter 30, now powered by the fully charged super capacitor 34, will send warning signals to an appropriate recipient indicating the occurrence of the fracture/crack damage to the structure.

Each piezoelectric composite coating sensor applied to a given structure is assigned a unique identification number corresponding to its installed position on the structure. When the warning signal is sent out by the wireless signal transmitter, damage location information including this identification number will be sent at the same time. Further implementation details in this regard are presented herein further below.

Photos of the piezoelectric composite coatings, wireless signal transmitter and energy harvesting circuit are given in the next section to describe the realization of the whole sensor system and the successful performance of crack detection by experimental studies.

Experimental Preparation and Testing

Attention is now turned to the experimental realization of the damage detection process achieved with the self-powered wireless smart coating sensor described above. The preparation of the piezoelectric composite coating is described first. The whole experimental set up and the testing process are then given and explained in detail.

Figure 4A:
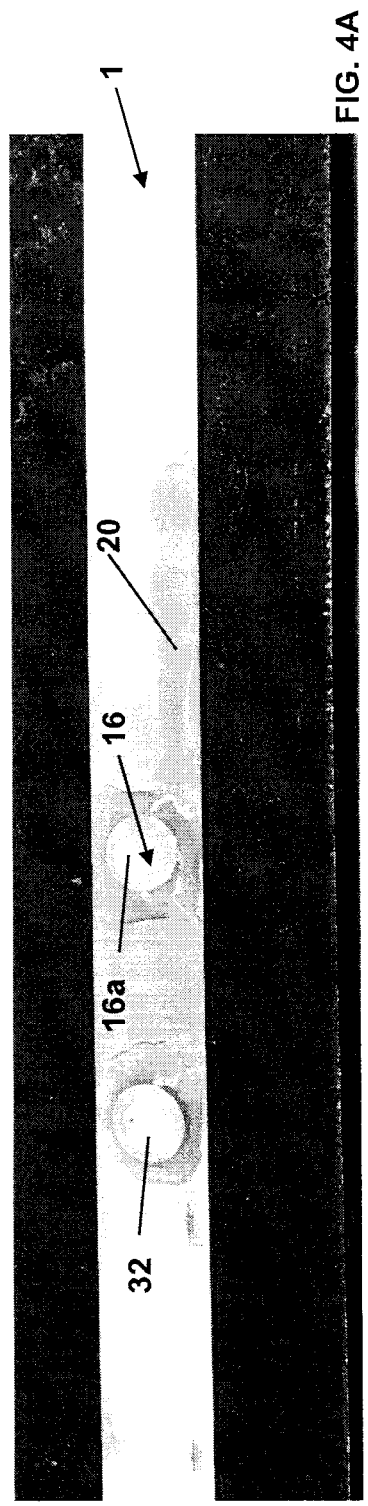
FIG. 4A shows placement of the piezoelectric patches of the damage detection and wireless signal transmission modules, together with an isolation layer of the composite coating of the damage detection module, on an aluminum beam during preparation of an experimental setup.
Figure 4B:
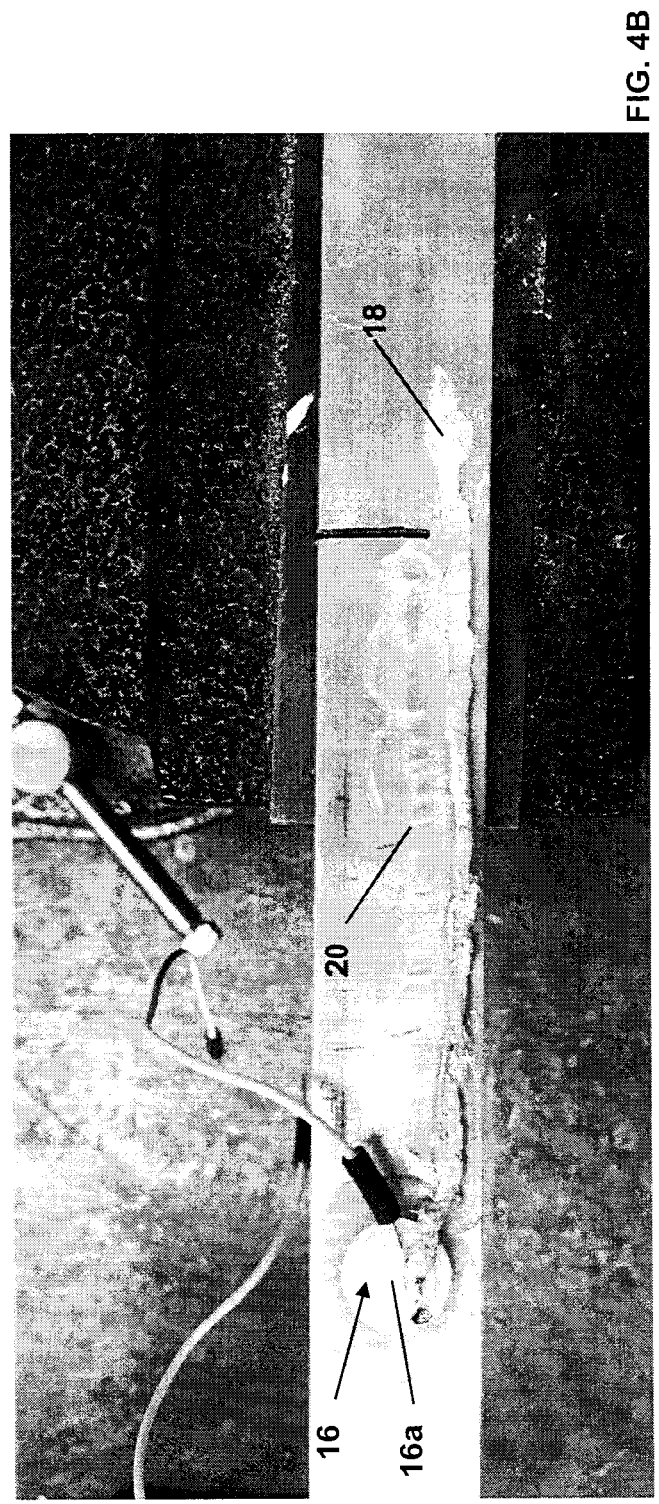
FIG. 4B shows the addition of a conductive layer of the composite coating of FIG. 4A over the isolation layer thereof, and connection of a detection circuit thereto.

FIGS. 4A and 4B respectively show different stages of the piezoelectric composite coating preparation before and after application of the conductive layer 18. In FIG. 4A, two circular piezoelectric patches (0.012 m in diameter, 0.002 m in thickness) are bonded on the surface of an aluminum beam, which serves as the host structure of the test setup, by 3M Epoxy metal weldment DP 100, a non-conductive epoxy. The left piezoelectric patch 32 shown in FIG. 4A is used as an energy harvester to charge the super capacitor 34 for powering the wireless signal transmitter 30, while the right piezoelectric patch 16 is used in the composite coating for the crack detection functionality of the sensor. The piezoelectric patches are coated with silver electrodes on their top and bottom surfaces and connected (grounded) with the aluminum substrate beam. The non-conductive epoxy deposit used to bond the right piezoelectric patch 16 to the beam is spread longitudinally of the beam in a direction away from the other patch 32, and this elongated trail of the non-conductive epoxy defines the isolation layer 20 of the piezoelectric composite coating. In FIG. 4B, an electrically conductive silver epoxy coating is added atop of the isolation layer 20 of the non-conductive epoxy metal weldment on a likewise longitudinal path spanning from atop the piezoelectric patch 16 to a point reaching beyond the distal end of of the isolation layer. According, as illustrated in FIG. 1A, the electrically conductive layer 18 covers little bit larger area of the beam than the isolation layer 18 so as to reach the second area $A_2$ situated beyond the end of isolation layer, thereby ensuring that the top and bottom electrodes of the piezoelectric patch are short connected by the conductive layer 18 and the conductive surface of the structure beneath the isolating layer.

FIG. 4B shows a large notch 40 cut into the beam 1 from one side thereof to reach close to the location covered by the conductive and isolating layers 20, 18 of the composite coating along the opposite side of the beam. In this case, when vibration takes place on the notched beam, a crack will be initiated at the inner end 40a of the notch and propagate across the conductive and isolating layers of the composite coating to the unnotched side of the beam. Once the crack propagates fully across the conductive layer 18 of the composite coating, the short connection circuit of the piezoelectric patch is broken, and the non-zero voltage will be generated on the surface 16a of the piezoelectric patch 16, thereby signifying that the crack has occurred.

Figure 5:
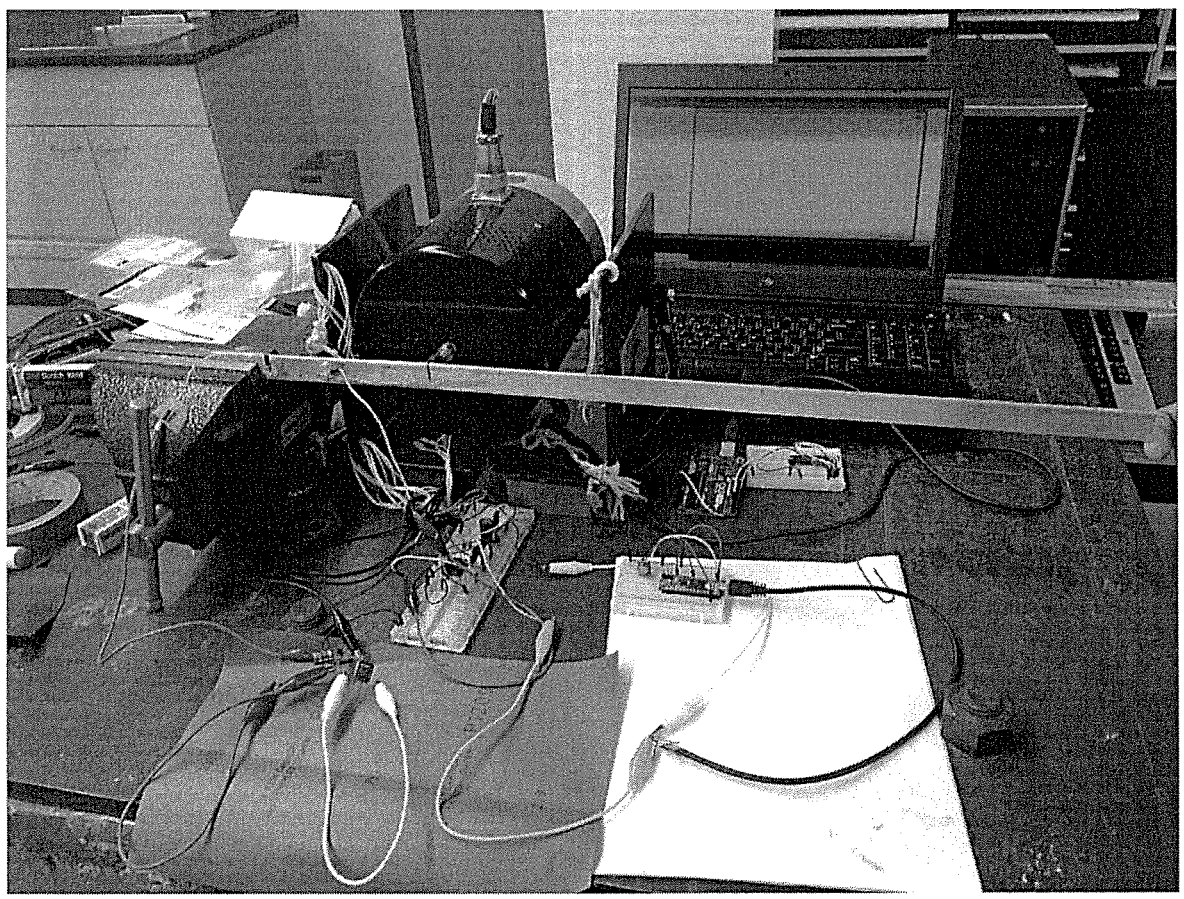
FIG. 5 shows the completed experimental setup.

Corresponding to the sensor system diagram given in FIG. 3, FIG. 5 shows the whole experimental layout of the damage detection system with the piezoelectric composite coating combined with the self-powered wireless data transmission module. An aluminum cantilever beam (0.6 m in length, 0.003 m in thickness and 0.02 m in width) with a large notch located at 0.13 m from the fixed end of the beam was used for the testing. A random dynamic loading was applied at the left side of the notch by a modal shaker. Two super capacitors with 5F capacitance and 5V fully charged voltage are connected in series to power the wireless signal transmitter. It is noted that it takes quite long time (more than 12 hours) to fully charge the super capacitor with the small piezoelectric patch used in this particular experiment, but the charging time can be significantly reduced if piezoelectric patches of larger sizes are used in the energy harvesting circuit 38.

Figure 6:
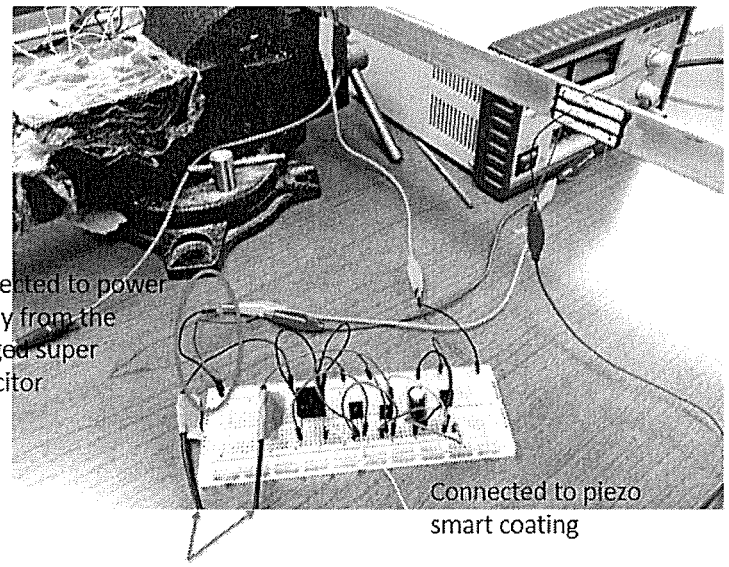
FIG. 6 shows additional circuit components of the experimental setup.

The diode bridge rectifier 27, small capacitor 26 and the electronic switch 28 controlling the wireless signal transmitter 30 were integrated on a solderless breadboard, which is shown in FIG. 6. Thyristor triodes were employed to act as the electronic switch, which is controlled by the piezoelectric layer 16 in the composite coating and the small capacitor 26 connected thereto via the diode bridge rectifier 27.

Figure 7:
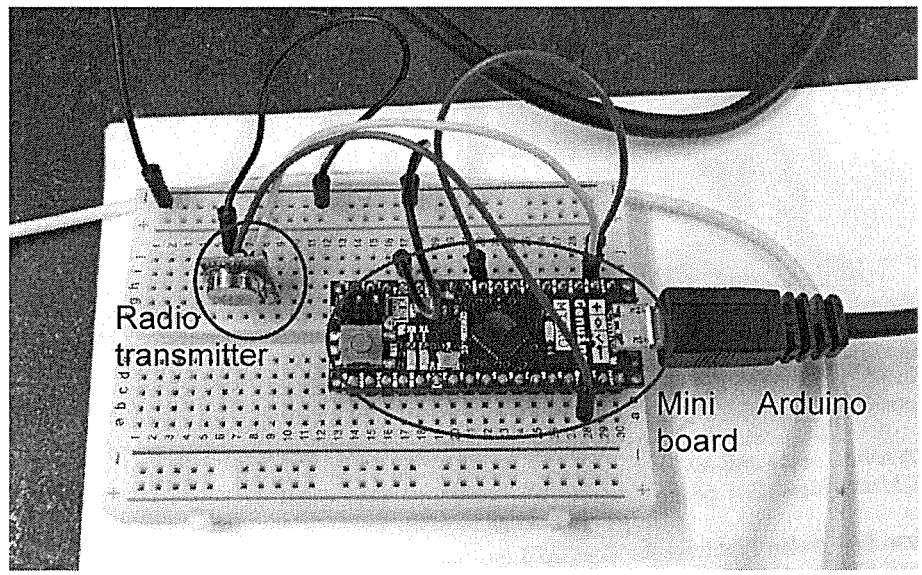
FIG. 7 shows a radio transmitter and connected microcontroller board of the wireless transmitter module.

An Arduino programmable microcontroller board and a radio transmitter were connected and used together as the wireless signal transmitter module 30, as shown in FIG. 7. The Arduino board is a development chip board that can be programmed and used to control external devices, such as radio transmitter, WiFi and Bluetooth devices. In the experimental procedure, once the damage occurs to the aluminum beam and the electronic switch 28 is turned on by the piezoelectric composite coating, the super capacitor 34 starts to provide power supply to the microcontroller board and the radio transmitter, thereby initiating a stored routine on the microcontroller that causes the transmitter to send out a warning signal. The digital signal sent out from the radio transmitter includes the piezoelectric composite coating ID number and position information to indicate the damage location. The piezoelectric composite coating number and position information can be obtained directly from the non-zero voltage on the piezoelectric layer as an input to the microcontroller. That is, for each input of the microcontroller that is linked to a respective coating-based sensor, the microcontroller can store a particular coating/sensor ID number and other relevant position information for that particular sensor in association with the particular input to which that sensor has been assigned. Accordingly, a non-zero voltage reading on any input of the micro-controller is the only input required to generate a warning signal that incorporates the appropriate coating/sensor ID and any other pre-stored location information for that sensor. The Arduino board used in the experimental setup had six analog signal input channels and hence can be programmed to recognize up to six different damage monitoring locations on a structure.

Figure 8:
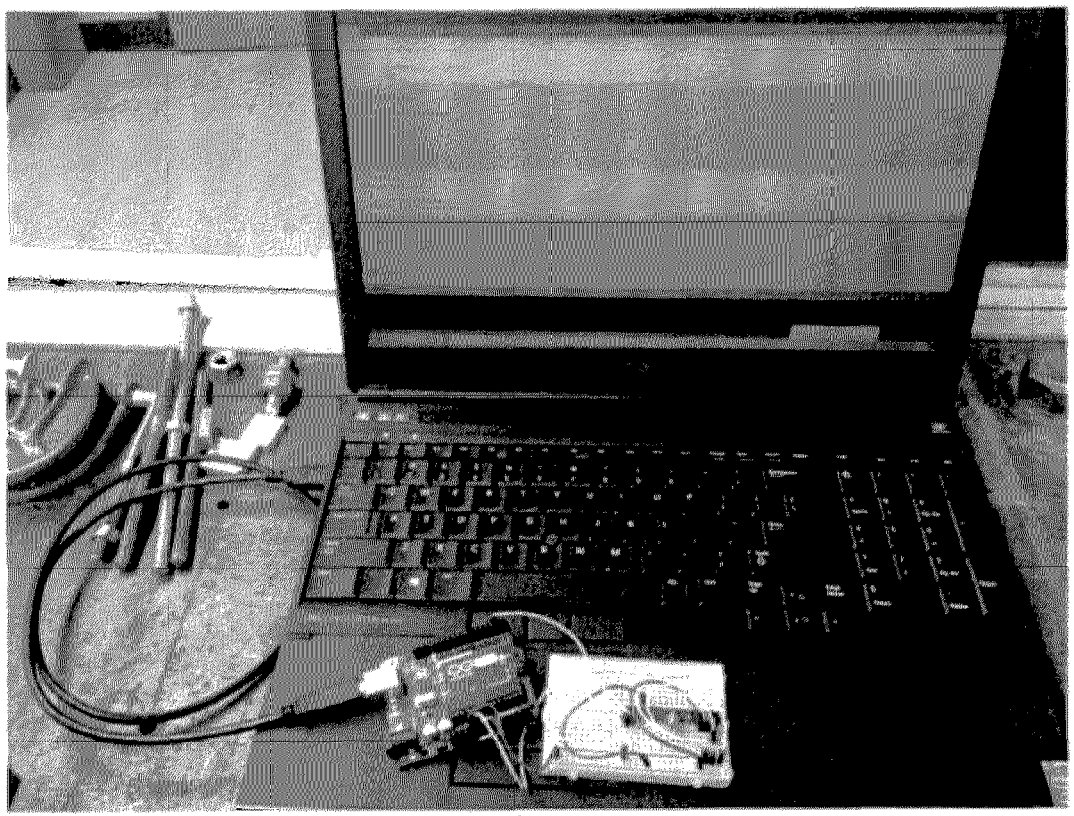
FIG. 8 shows a radio receiver and a connected microcontroller board coupled to a computer workstation to form a monitoring device that receives damage warning signals from the wireless transmitter module and displays damage warning messages accordingly.

At the signal receiver side shown in FIG. 8, another Arduino microcontroller board and connected radio receiver were employed to obtain the damage occurrence and location information transmitted in the warning signal from the signal transmission module. The microcontroller board was connected with a personal computer to enable display and storage of this useful information from the smart coating system. Again, the particular microcontroller board used in the experimental setup can receive different signals from six radio receivers. Accordingly, a single computerized monitoring device can easily monitor a significant number of smart coating sensors, including sensors installed on different structures at varying locations. As an alternative to a desktop or laptop computer, the monitoring device could be any of a number of different computerized devices, including tablet computers, smart phones, etc.

Figure 9A:
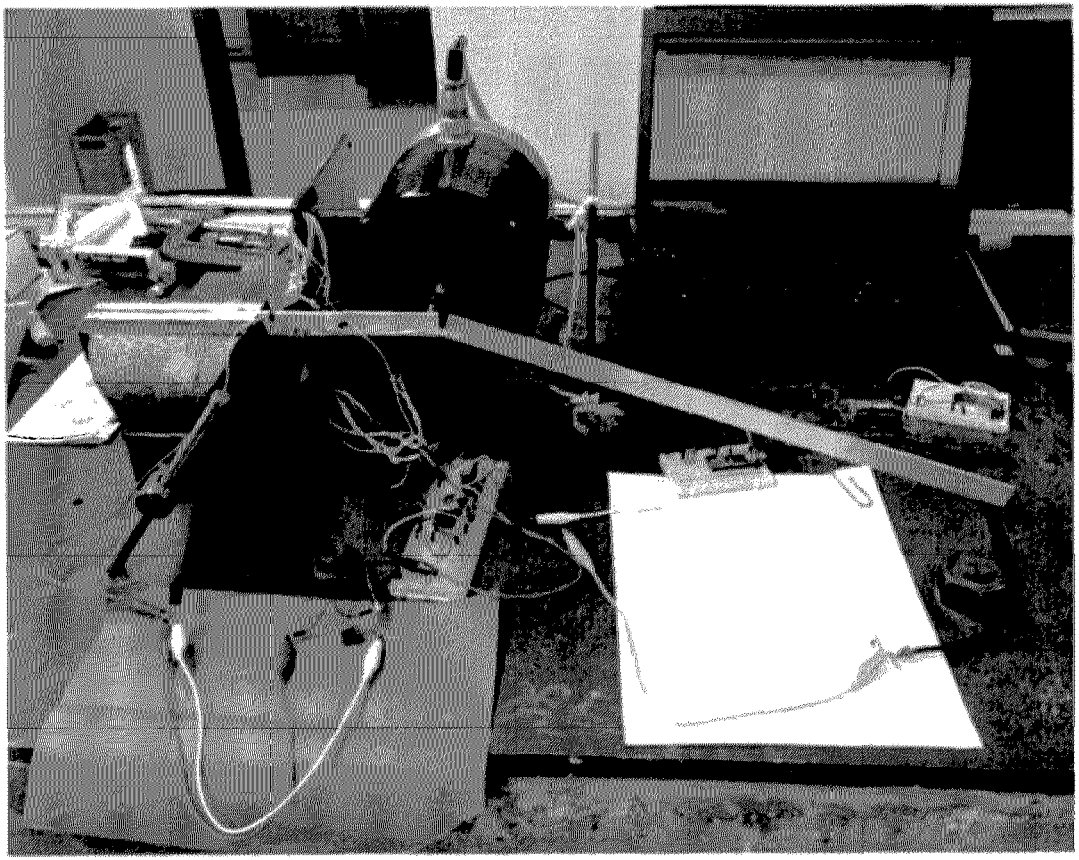
FIG. 9A shows the experimental setup and computer workstation after occurrence of a failure in the aluminum beam.
Figure 9B:
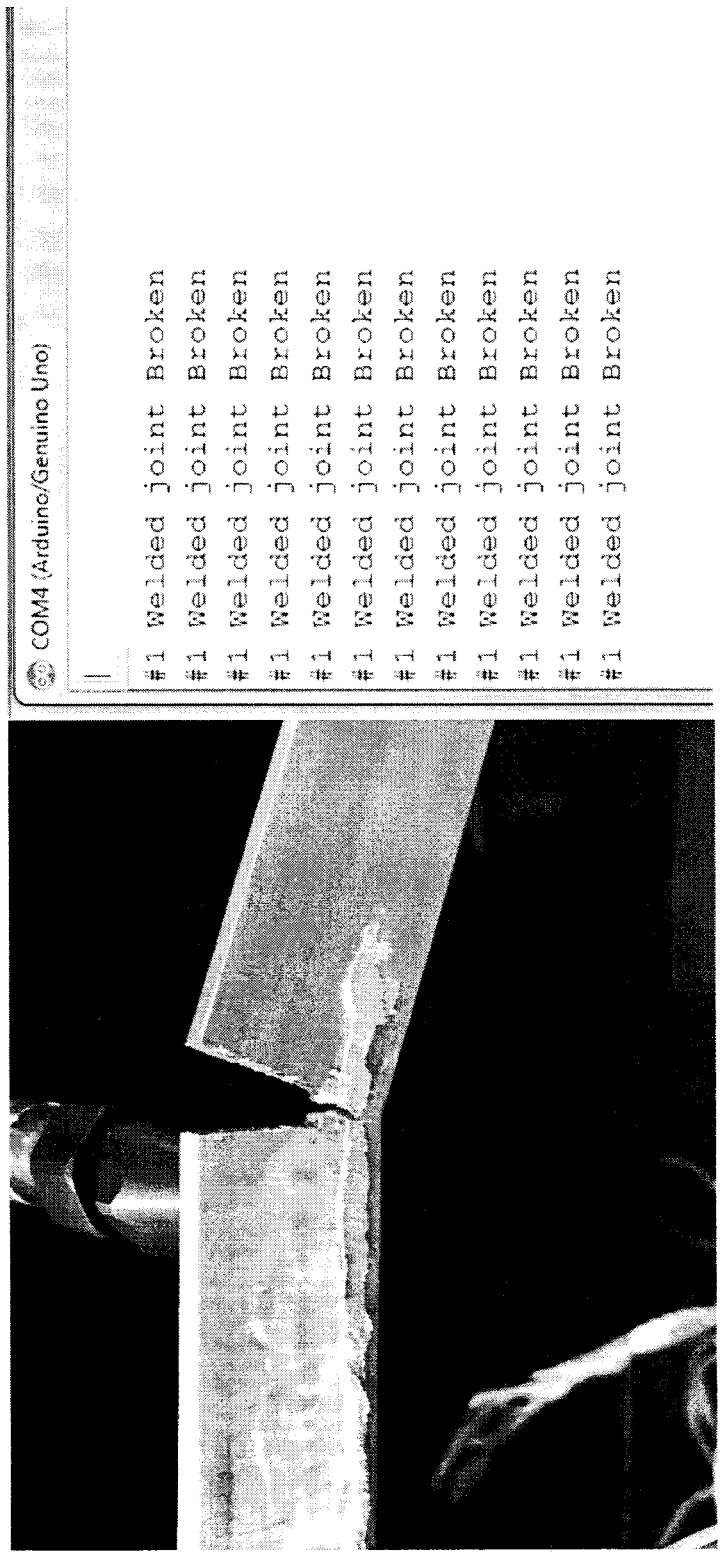
FIG. 9B shows side by side close-up views of the failed beam and computer workstation display of FIG. 9A.

FIG. 9 shows the damage detection result, when a crack was initiated at the inner end of the notch in the aluminum beam and propagated across the piezoelectric composite coating after approximately 30 minutes of beam vibration. From the zoomed-in screen shot of the personal computer, it is seen that the sensor system successfully detected the occurrence of the crack damage. Since the experimental setup included only one piezoelectric composite coating and performed only a single damage simulation run, only joint ID number one in the on-screen display shows a broken state of the joint.

The disclosed system can be produced cost efficiently. The total cost of the whole experimental system is estimated as $84 USD. The rough costs for different parts and modules are piezoelectric patches at 2×$2 USD; super capacitors: 2×$4 USD; microcontroller board: 2×25 USD; radio transmitter at 1×$5 USD; radio receiver at 1×$7 USD; and diodes, thyristors, and small capacitor at $10 USD.

In summary, a low cost on-board real time damage detection method has been developed by introducing a new piezoelectric composite coating combined with a self-powered wireless signal transmission module. Experimental testing has realized successful crack detection with the proposed technique and the design of the self-powered wireless sensor system.

Since various modifications can be made in the invention as herein above described, and many apparently widely different embodiments of same made within the scope of the claims without departure from such scope, it is intended that all matter contained in the accompanying specification shall be interpreted as illustrative only and not in a limiting sense.

REFERENCES

[1] Yan G, De Stefano A, Matta E, et al. A novel approach to detecting breathing-fatigue cracks based on dynamic characteristics. J Sound Vib 2013; 332: 407-422.
[2] Doebling S W, Farrar C R, Prime M B and Shevitz D W. Damage identification and health monitoring of structural and mechanical systems from changes in their vibration characteristics: A literature review. Report for Los Alamos National Lab Report no. LA-13070-MS, 1996.
[3] Salawu O S. Detection of structural damage through changes in frequency: A review. Eng Struct 1997; 19: 718-723.
[4] Doebling S W, Farrar C R and Prime M B. A summary review of vibration-based damage identification methods. The Shock and Vibration Digest 1998; 30: 91-105.
[5] Montalvao D. A review of vibration-based structural health monitoring with special emphasis on composite materials. The Shock and Vibration Digest 2006; 38: 295-324.
[6] Wang X Q, Wong W O, Cheng L. Modal power flow with application to damage detection, International Journal of Engineering Science 2009; 47:512-523.
[7] Tua P S, Quek S T, Wang Q. Detection of cracks in cylindrical pipes and plates using piezo-actuated Lamb waves, Smart Mater. Struct. 2004; 14:1325-1342.
[8] Newland D E. Wavelet analysis of vibration Part 1: theory, J. Vibr. Acoust 1994; 116:409-416.
[9] Xu Y L, Huang Q. and Zhan S et al. FRF-based structural damage detection of controlled buildings with podium structures: experimental investigation, Journal of Sound and Vibration 2014; 333:2762-2775.
[10] Wang Q and Deng X. Damage detection with spatial wavelets, International Journal of Solids and Structures 1999; 36:3443-3468.

The invention claimed is:

1. A composite coating for use in detecting damage to a structure that is subject to vibrations, said coating comprising:
a piezoelectric layer applied to an electrically conductive surface on the structure at a first area thereof;
an electrically conductive layer overlapping an outer surface of said piezoelectric layer and spanning to a discrete second area of the electrically conductive surface where said electrically conductive layer contacts said second area of the electrically conductive surface; and
an isolating layer of electrically insulative material disposed between the electrically conductive surface and the electrically conductive layer at an intermediate area residing between said first and second areas to electrically isolate the electrically conductive layer from the electrically conductive surface over said intermediate area.

2. The coating of claim 1 in combination with a detection circuit connected between the outer surface of the piezoelectric layer and the second area of the electrically conductive surface, said detection circuit normally having a zero voltage measurement thereacross due to an electrical short defined between the outer surface of the piezoelectric layers and the second area of the electrically conductive surface by the conductive layer, until damage to the structure at the intermediate area causes a break in the electrically conductive layer, at which point excitation of the piezoelectric layer by vibration of the structure creates a non-zero voltage in the detection circuit, thereby confirming the presence of said damage.

3. The combination of claim 2 wherein detection circuit comprises a transmitter arranged to wirelessly transmit a damage warning signal in response to said non-zero voltage.

4. The combination of claim 3 wherein the detection circuit is configured to trigger closing of a switch between the transmitter and a power source in response to said non-zero voltage.

5. The combination of claim 3 wherein the transmitter is powered by a power source comprising a piezoelectric voltage source that is separate from the piezoelectric layer of the coating.

6. The combination of claim 5 wherein the piezoelectric voltage source is a piezoelectric element installed on the same structure as the coating.

7. The combination of claim 6 wherein the piezoelectric voltage source is a second piezoelectric layer residing at a separate area located discretely of the first, second and intermediate areas.

8. The combination of claim 5 wherein the power source further comprises a storage device from which the transmitter is powered and which is charged by the piezoelectric voltage source.

9. The combination of claim 8 wherein the storage device is a capacitor.

10. The combination of claim 9 wherein the detection circuit comprises a second capacitor arranged to be charged by the non-zero voltage created in the detection circuit by said damage to the structure, and to trigger activation of the transmitter once fully charged.

11. The combination of claim 4 comprising an electronic switch connected between the transmitter and the power source to establish connection therebetween in response to said non-zero voltage, and the detection circuit comprises a voltage stabilizer connected between the piezoelectric layer and the electronic switch to ensure sufficient voltage to trigger closure of said electronic switch in response to said non-zero voltage.

12. The combination of claim 11 wherein the voltage stabilizer is a capacitor.

13. The coating of claim 1 wherein the isolating layer comprises a non-conductive epoxy.

14. The coating of claim 1 wherein the structure is made of non-conductive material and the electrically conductive surface is a conductive surface coating applied over the non-conductive material of the structure.

15. The coating of claim 14 wherein the conductive surface coating comprises a conductive epoxy.

16. The coating of claim 1 wherein the structure comprises first and second metal members attached together at a welded joint therebetween, the first and second areas of the conductive surface being respectively defined on the first and second metal members with the welded joint residing at the intermediate area between said first and second areas, and the conductive layer spanning across said welded joint to detect damage thereto.

17. The coating of claim 1 wherein the electrically conductive layer comprises a conductive epoxy.

18. The coating of claim 1 wherein each piezoelectric layer comprises a piezoelectric patch.

19. A system for use in detecting damage to a structure that is subject to vibrations, said system comprising:
    a composite coating comprising:
        a piezoelectric element for application over an electrically conductive surface on said structure at a first area thereof; and
        an electrically insulative material for application over said electrically conductive surface in a position adjacent said piezoelectric element to define an isolating layer;
        a spreadable electrically conductive material for application to the structure along a path reaching from a position overlapping the piezoelectric element and bridging over the isolating layer to a second discrete area on the electrically conductive structure, thereby defining an electrical short spanning between the first and second areas of the electrically conductive surface and bridging over an intermediate area between said first and second areas; and
    a detection circuit connectable between an outer surface of the piezoelectric layer and the second area of the electrically conductive surface to detect occurrence of damage to the structure at the intermediate area via a change in relative voltage between the outer surface of the piezoelectric layer and the second area of the conductive surface when said damage to the structure causes a break in the electrical short between the piezoelectric layer and the second area of the electrically conductive surface, whereby a zero-voltage normally exists in the detection circuit, even during excitation of the piezoelectric element by vibration of the structure, due to the electrical short between the piezoelectric element and the second area of the electrically conductive surface, but breakage of the conductive layer by said damage to the structure generates a non-zero voltage in the detection circuit during excitation of the piezoelectric element by vibration of the structure.

20. The system of claim 19 wherein the electrically insulative material is a spreadable material.

* * * * *